Figure 4:
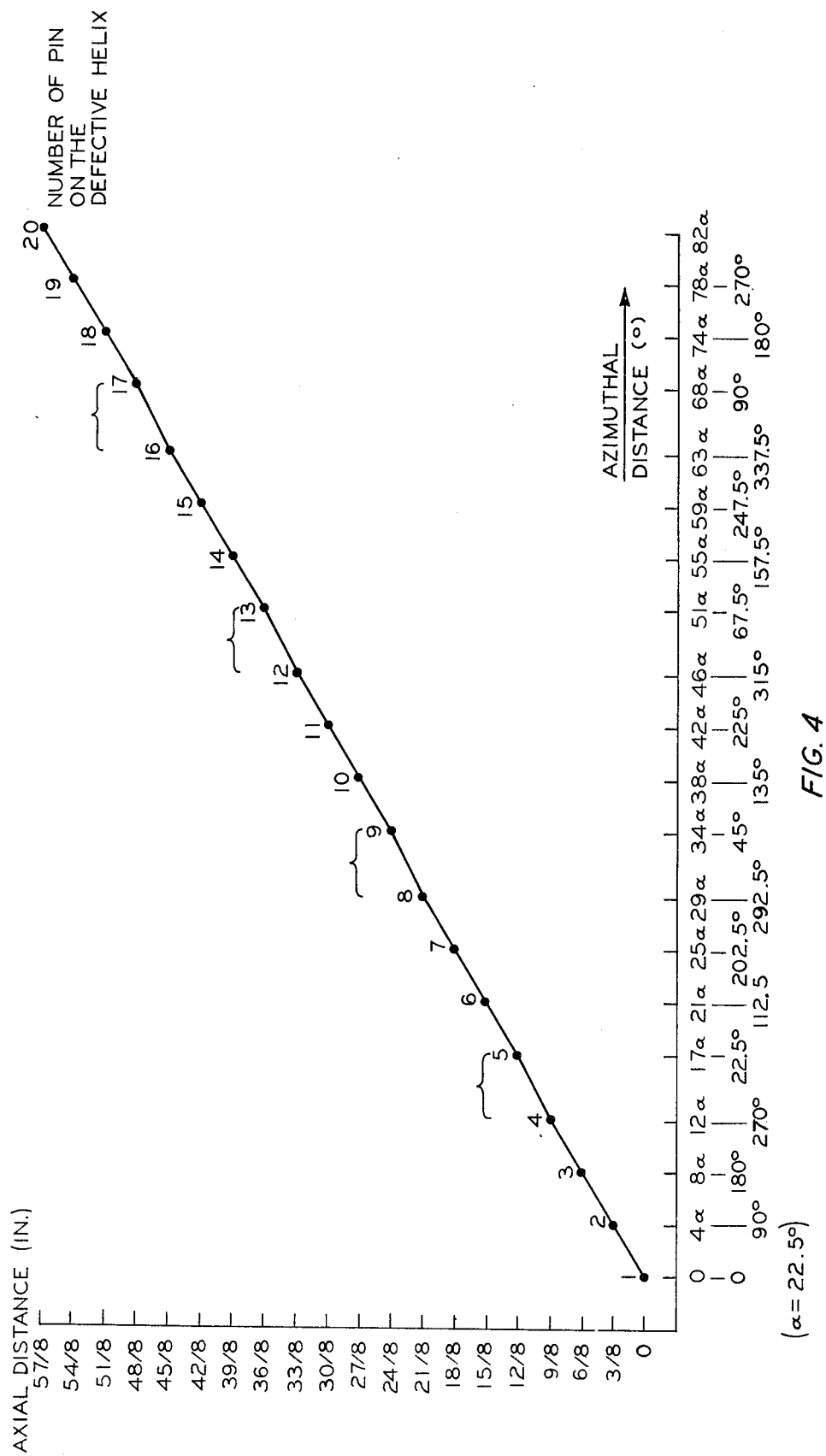

United States Patent [19]

Cole

[11] 4,065,240

[45] Dec. 27, 1977

[54] CARBON BLACK PELLETER WITH EVEN PIN DISTRIBUTION

[75] Inventor: Clinie E. Cole, Borger, Tex.

[73] Assignee: Phillips Petroleum Company, Bartlesville, Okla.

[21] Appl. No.: 705,482

[22] Filed: July 15, 1976

[51] Int. Cl.$^2$ .............................................. B01J 2/10
[52] U.S. Cl. ................................................... 425/222
[58] Field of Search ................ 425/209, 222; 264/117; 23/313 R, 314 R; 259/DIG. 22

[56] References Cited

U.S. PATENT DOCUMENTS 3,353,208  11/1967  Fergus .................................. 425/222
3,825,233   7/1974  Henderson ..................... 259/DIG. 22

Primary Examiner—Robert D. Baldwin

[57] ABSTRACT

A carbon black pelleter comprising a pinned shaft rotatably arranged in a housing with the pin density being essentially constant over the entire shaft and with the further provision that not more than about 3% of the pins are located at the same axial location and that not more than about 10% of the pins are located at the same azimuthal location is provided for. The pins are arranged on at least one defective helix being defined by the fact that the location of the pins on the shaft is essentially that of a helically shaped line but that the pitch of axially adjacent pins, defined by the formula $$p = 360°/a \cdot t$$

Wherein $p$ is the pitch of axially adjacent pins, $a$ is the azimuthal angular distance in degrees between axially adjacent pins along the defective helix and $t$ is the axial distance between these axially adjacent pins, changes a plurality of times along the defective helix.

8 Claims, 5 Drawing Figures

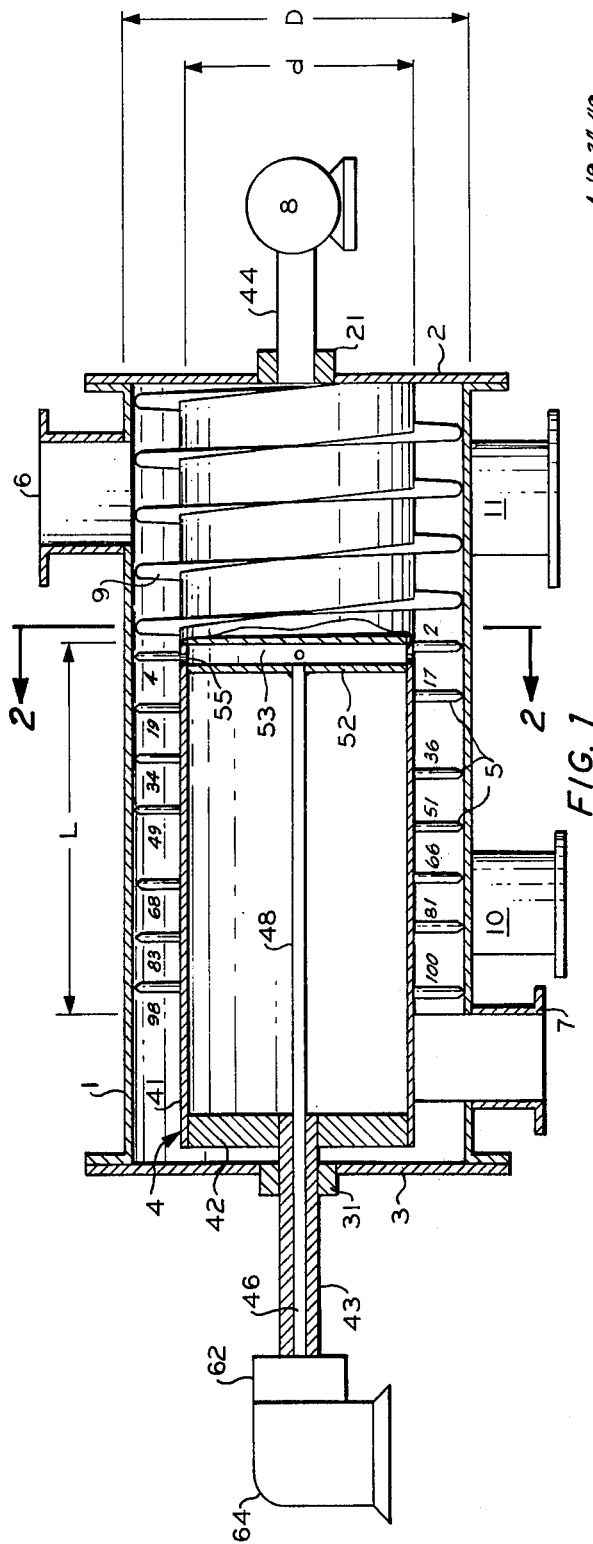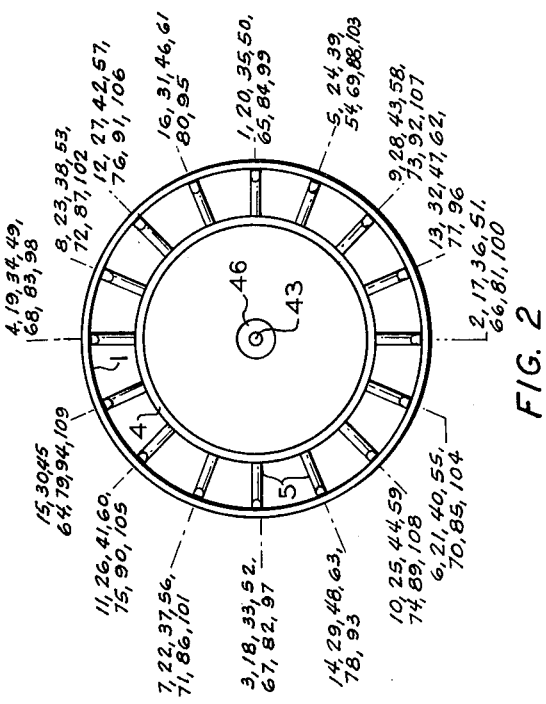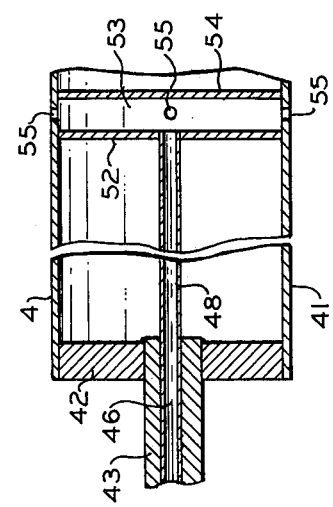

CARBON BLACK PELLETER WITH EVEN PIN DISTRIBUTION

The present invention relates to the pelleting of carbon black. More specifically the present invention relates to a carbon black pelleter. In particular the present invention is concerned with a carbon black pelleter comprising a pinned shaft rotatably arranged in a housing.

BACKGROUND OF THE INVENTION

Various designs of carbon black pelleters are known in the art. In one known pelleter one shaft with pins is rotatably and coaxially arranged in a housing with a cylindrically shaped interior. The pins are arranged in a helical pattern. Other known pelleters of this type have the pins arranged in a plurality of discs or in a plurality of combs along the shaft. Other known pelleters utilize two or more pinned shafts in one housing.

The main problem in making pellets of carbon black particularly in such pelleting apparatus is the pellet size distribution, as well as the pellet shape. Ideally the produced pellets would be all spheres of the same diameter. This cannot be achieved in a commercially feasible apparatus or process. However, it would be desirable to have a pelleter available that can produce pellets with a very uniform, i.e., quite narrow pellet size distribution.

THE INVENTION

It is thus one object of this invention to provide a pelleter for pelletizing carbon black.

Another object of this invention is to provide a pelleter in which pellets with a narrow size distribution can be produced.

A further object of this invention is to provide a pelleter than can be built from known materials and in essentially known steps.

Figure 5:
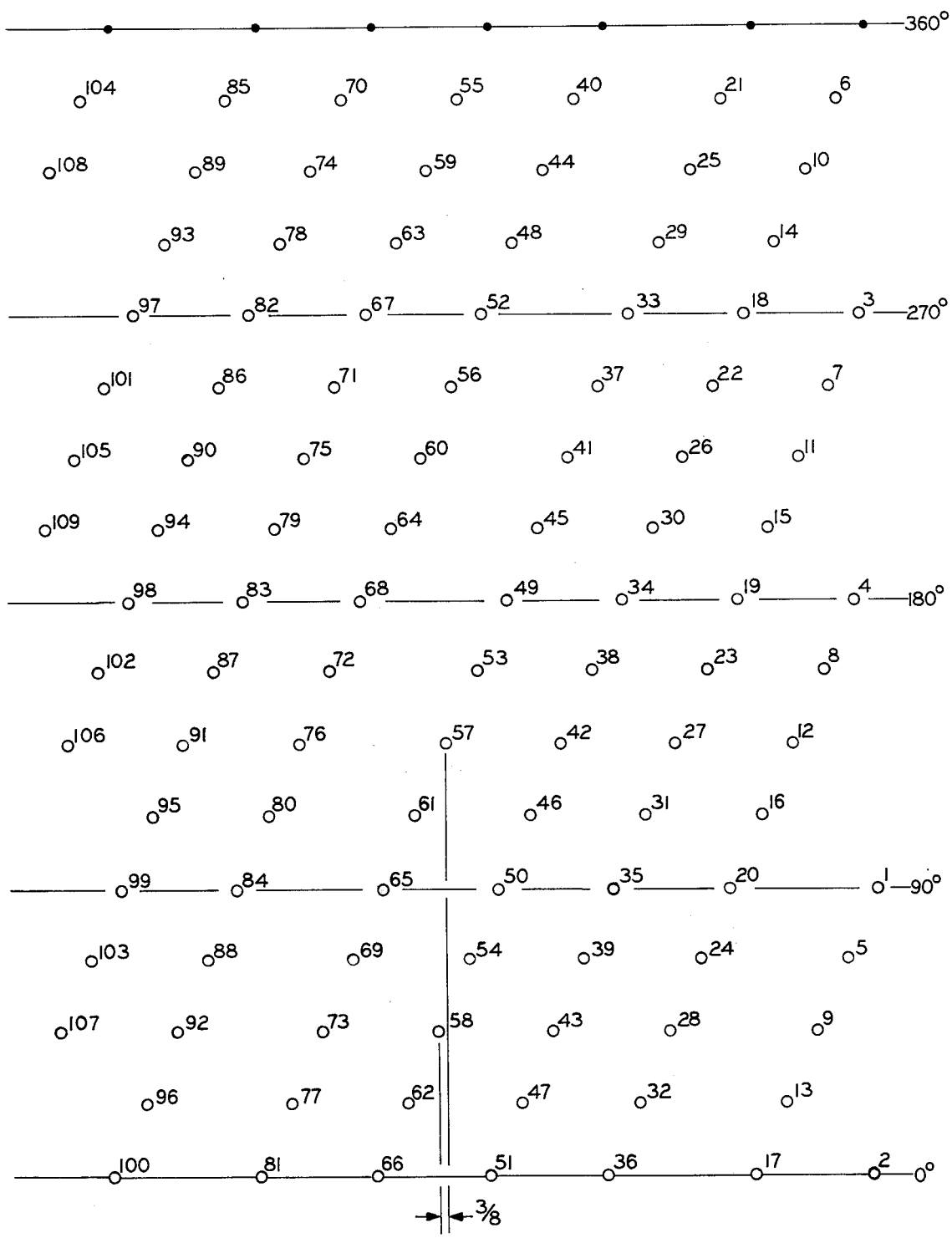

These and other objects, advantages, details, features and embodiments of this invention will become apparent to those skilled in the art from the following detailed description of the invention, the appended claims and the drawings in which FIGS. 1 and 2 show two cross-sections through a pelleter in accordance with this invention, FIG. 3 shows a detail of the pelleter, FIG. 4 shows a diagram illustrating an example of the pin arrangement, and FIG. 5 shows another diagram to illustrate the pin arrangement on the shaft when rolled into a plane.

In accordance with this invention, there is provided a carbon black pelleter which comprises a housing with an essentially cylindrically shaped internal surface. Within this housing a shaft is coaxially and rotatably arranged. On this shaft a plurality of pins extending essentially radially into close proximity of said internal surface are arranged. The pin density over the entire shaft length is essentially constant. The pins in accordance with this invention are arranged on the shaft in such a manner that not more than about 3% of the pins are located at the same axial location and not more than about 10% of the pins are located at the same azimuthal location. The important feature of this invention consists in the very even distribution of the pins so that the carbon black material to be pelleted is subjected to a smooth and constant pin action throughout the pelleting process and along the pinned shaft.

In order to make the description of further and preferred embodiments of this invention more readily understandable, terms that will be used in this description will first be defined. These terms are mostly connected to the description of the pin distribution along a cylinder. Each mathematical point on a given cylinder can be described and is described by the axial position, e.g., in inches from the beginniing of the cylinder, and the azimuthal position, e.g., in degrees starting at any reference line at 0° and counting to 360°. These two coordinates, namely the axial position and the azimuthal position, are generally sufficient to describe the important pin geometry of the present invention since the description will relate to the position of the pins wih respect to each other on a given cylinder so that the third of the cylindrical coordinates, namely the radial position, will generally be constant or the same for all the pins.

Whenever in the following relative positions between pins are described, these relative positions are intended to refer to the mathematical centers of these pins. Since the actual distance between two pins is smallest on the shaft and largest at the free pin ends, the pin geometry in the following is in some instances described with respect to an imaginary cylinder which is located coaxially both to the shaft and to the housing at the same distance from the shaft and from the housing. This imaginary cylinder therefore has a radius $0.5 \times (R_1 + R_2)$; $R_1$ is the radius of the shaft, whereas $R_2$ is the radius of the housing. The term "trace of a pin" refers to the intersection of the center axis of the pin and the imaginary cylinder.

The distance between pin centers is referred to in the following as the distance between pins. This distance is measured on the respective cylinder surface. The distance between the pins can be seen as a straight line in a drawing when the pin cylinder, e.g., the imaginary cylinder with the pin traces, is rolled into a plane.

The term "same axial position" of pins refers to the fact that the centers of these pins are located within a ring around the shaft having the axial length of about 1.5 pin diameters. Similarly, the term "same azimuthal position of pins" refers to the fact that the centers of these pins are arranged along the shaft within a longitudinal straight strip of about 2 pin diameters width. The important feature of this invention consists in the fact that only very small percentages of the pins as defined above have the same axial position (the pins are not arranged in discs) and that only very few of the pins have the same azimuthal position (the pins are not arranged in combs).

The fact that the pin density, i.e., the numbers of pins per unit area, is approximately constant all over the pinned shaft can be described in a more limited manner by the minimum distance between the pins on the one hand and the maximum area with no pins on the other hand. If the minimum distance between two pins is assumed to be $r$, the maximum spreading of the pins is such that no circle having a radius larger than R, wherein R is about $0.58r$ to about $0.8\ r$, can be drawn anywhere on the imaginary cylinder rolled into a plane that does not at least contain one pin trace center. A circle having the radius R can also be defined as the maximum empty circle (i.e., containing no pin trace center) admissible; any larger circle will contain at least one pin trace center. Every set of values $r$ and R within this definition defines the minimum and maximum spacing of the pins. The radius $r$ of a circle that can be drawn around every pin trace without encompassing another pin trace therein is in the range of about $\frac{1}{4}(R_1 + R_2)$ and about $1/6(R_1 + R_2)$. This relationship defines the minimum pin center distance as a function of the diameter of the imaginary cylinder defined above. The minimum pin distance preferably is about 6 to 12 pin diameters. This relates to minimum pin distance to the pin diameter.

In a preferred embodiment of this pelleter, the shaft is provided with about 80 to about 200 pins. These pins preferably are each situated at a different axial position and the distance between axially adjacent pins is smaller than the diameter of the pins. This axial distance between axially adjacent pins can be in the range of about 0.5 to about 0.9 pin diameters. It has to be emphasized that axially adjacent pins generally are not those pins that are located closest together but are two pins that are closest together in the axial direction only.

The presently preferred pelleter is one that has the pins arranged in such a manner that one or more of the following absolute ranges apply to the pin geometry. The pin density across the entire imaginary cylinder is in the range of about 1/50 to about 1/20 pins/sq. in. The radius of the imaginary cylinder is about 0.4 foot to about 1.5 feet. The axial length of the shaft that is provided with pins is about 30 to about 60 inches. The shaft diameter is about 0.6 foot to about 2 feet. The diameter of the internal surface of the housing is about 1 to 4 feet.

The pins being attached to the shaft so that the pin density is approximately constant all over the shaft are preferably arranged in a geometrical pattern that can be characterized as a defective helix. The pins are arranged along the shaft in at least one such defective helix. The defective helix is defined negatively as compared to a normal or non-defective helix. When the pins are arranged on a normal helix, the ratio of the axial distance of two axially adjacent pins to the angular or azimuthal distance of these pins is constant. This can be expressed by the formula $$p = (360°/a) \cdot t$$

in which formula $p$ is the pitch of the helix, $a$ is the azimuthal angular distance in degrees between adjacent pins along the helix, and $t$ is the axial distance of two axially adjacent pins on the helix. In the normal helix, the value $p$ is a constant. In accordance with the preferred embodiment of this invention, however, the pins are arranged on a defective helix that is a line winding around the shaft in approximately a helical configuration with the important exception, however, that the pitch $p$ as defined by the formula above is not a constant value along this line but changes several times along this defective helix. For the preferred defective helix, all axially adjacent pins have the same axial distance $t$ between each other, and the azimuthal angular distance $a$, between axially adjacent pins, changes a plurality of times along the defective helix. Advantageously, this change of the azimuthal angular distance $a$, along the defective helix, is a periodical change. This periodical change in a particularly preferred variation is such that the azimuthal distance $a$, between axially adjacent pins, changes periodically between values along the defective helix. Thus the azimuthal angular distance $a$, along the defective helix, has a first value $a1$ for a first number of pins, then has a second value $a2$ for a second number of pins, then has a first value $a1$ for a third number of pins which is the same as the first number of pins, etc. Preferably the difference between $a1$ and $a2$ is a small fraction of 360°, e.g., 1/10 to 1/20 of 360°. A particular example of the change of the azimuthal distance of axially adjacent pins would be that the azimuthal distance for three consecutive pins is 90° followed by a distance of 112°30' for one pin, which sequence thereafter is periodically repeated.

The ratio of the inner diameter D of the housing of the pelleter to the outer diameter $d$ of the shaft to which the pins are attached in accordance with a further preferred embodiment of this invention is within the range of about 1.3 to about 2. This means that the shaft diameter is rather large and the space in which the actual pelleting occurs is an annular space left between the shaft and the housing. This particular configuration allows the use of short and sturdy pins and the diameter of these pins can be considerably reduced as compared to pelleters having the same throughout but having a very small-diameter shaft as compared to the internal diameter of the housing. Furthermore, the carbon black mass and the carbon black pellets, as well as the pelleting liquid, are subjected to a very uniform pelleting action.

The internal diameter D of the housing in a further embodiment of the invention is related to the length L of the portion of the shaft that is provided with pins. The ratio D/L preferably is in the range of about 0.5:1 to about 2:1. Furthermore, the ratio of the length of the pins to the diameter of the pins preferably is within the range of about 5 to about 30. This ratio most preferably has a value of about 10.

Yet another preferred feature of the pelleter of this invention consists in the provision of one or more outlets for pelleting liquid directly at the shaft surface. In particular the shaft can be a hollow shaft having one or more holes therein and the hollow shaft can be connected to a source for the pelleting liquid so that the pelleting liquid is injected into the carbon black through the holes in the shaft. Whereas known pelleters inject pelleting liquid through the housing or towards the housing, this feature of the preferred embodiment provides a system for injecting pelleting liquid which is very efficient and injects the pelleting liquid from moving openings which are moved through the bulk of the carbon black. An efficient contacting of the carbon black with the pelleting liquid is thereby achieved.

Since the pelleting liquid has to come into contact with the carbon black during the pelleting process, it is presently preferred to provide the outlets for the pelleting liquid on the shaft surface only in an area that is proximate to the upstream pins. By this arrangement the carbon black and the pelleting liquid are mixed right at the beginning of the pelleting operation in a fast and efficient manner.

In order to reduce the volume of pelleting liquid present when a hollow shaft is being used, it is preferred to arrange in this embodiment two parallel plates proximate to the upstream pins within the hollow shaft which plates are perpendicular to the shaft axis. The two parallel plates are spaced a small distance apart from each other and contact the interior of the hollow shaft in a fluid-tight manner. The openings through the shaft in this preferred embodiment are arranged such as to connect the interior of the shaft confined between the two plates with the annular space between the shaft and the housing. Conduit means are provided for to introduce a pelleting liquid into the interior of the shaft between the two plates and these conduit means are connected to one of the two plates.

The horizontally arranged carbon black pelleter is provided with a carbon black inlet at the upstream end thereof and with an outlet for the pellets at the downstream end thereof. Furthermore, the carbon black pelleter can be provided with a continuous flight at the upstream end of the shaft underneath the inlet of the carbon black such as to move the carbon black introduced into the housing towards the pelleting section or the pin section of the shaft following this continuous screw or flight in axial direction. The pitch of such a screw is generally several times larger than the average pitch of the defective helix as defined above.

The invention will still be more fully understood from the following description of the drawing.

FIG. 1 shows a longitudinal cross-section through a pelleter in accordance with this invention and FIG. 2 shows a cross-section through the pelleter shown in FIG. 1 along lines 2—2. Within housing 1, closed by an upstream end plate 2 and a downstream end plate 3, a shaft 4 is rotatably arranged. Several pins 5 are welded to the shaft 4. An inlet 6 for the introduction of flocculent carbon black and an outlet 7 for the removal of carbon black pellets are provided for. The outlet 7 is obtained by cutting out a segment of large azimuthal extension from the circular housing. A motor 8 is provided for which can rotate the pin shaft 4. At the upstream end of the pin shaft 4 and underneath the inlet 6, the pin shaft 4 is provided for with a continuous flight or screw 9.

The shaft 4 essentially consists of a hollow cylinder 41 closed on both ends by end plates 42, of which only the downstream end plate is shown in the drawing. The end plates in turn are connected to rods 43 and 44. These rods are rotatably arranged in bearings 21 and 31. Rod 43 has an axial channel 46 to permit the throughput of pelleting liquid. At the end facing into the hollow cylinder 41, the rod 43 is provided with a thin tube 48 communicating with the channel 46. This thin tube 48 in turn is connected to a first plate 52. This first plate 52 and a second plate 54 are arranged perpendicular to the longitudinal axis of the pelleter. The distance between the two plates is small and in the order of 2 inches. The two plates 52 and 54 are arranged inside of the hollow cylinder 41 in a fluid-tight manner such as to define a chamber 53 between them. The thin pipe 48 connects the channel 46 and the chamber 53. In the area between the two plates 52 and 54, four holes 55 are drilled into the cylinder 41 at locations where no pins 5 are arranged. Rod 43 and channel 46 are connected via a fluid-tight joint 62 to a source of pelleting fluid 64.

The pelleter housing 1 is supported by two supports 10 and 11.

The pins 5 which are arranged along the hollow cylinder 41 along a defective helix, as will be explained in detail later, have chisel-shaped edges at their free ends that during the rotation of the shaft 4 are moved along the housing 1 at a small distance of, e.g., ¼ inches to ⅜ inches from said housing like knives. The individual pins 5 are welded to the cylinder 41. As mentioned several times above, the pins 5 are arranged along the shaft 4, more particularly along the outside of the hollow cylinder 41, in the pattern of a defective helix. To explain this in more detail, the pins have been numbered 1 through 109. These numbers are shown in the drawing in FIGS. 1, 2 and 4. Every pin has the same axial distance from that pin that is axially adjacent to this pin on the defective helix. It has to be emphasized that this axially adjacent pin is not the closest pin. Thus the axial distance between pins 1 and 2, between pins 2 and 3, between pins 3 and 4, etc., is always ⅜inch. The azimuthal angular distance between those adjacent pins along the defective helix is not the same for all the pins. As can be seen particularly from FIGS. 2 and 4, the first three distances between pins 1, 2, 3 and 4 are all 90°. However, the azimuthal distance between pin 4 and pin 5 is 112°30′. After pin 5 three pins (6, 7 and 8) follow that have 90° distance. Then again the azimuthal distance between pin 8 and pin 9 is 112°30′ as can be seen from FIGS. 2 and 4. The consequence of this arrangement of pins along a defective helix can also be seen in FIG. 1. Most of the pins shown in that figure are 15 pin numbers apart. In case of pins 49 and 68, as well as 17 and 36 and 81 and 100, however, the pins are 19 pins apart. It has to be emphasized here that these pins are not axially adjacent pins in the sense defined above, since several revolutions of the defective helix are between pins 34 and 49, for instance.

FIG. 4 shows the pin location in a defective helix rolled quasi into a plane. A non-defective or normal helix would consist of a row of points connected by a straight line. In FIG. 4 the pin locations are not on a straight line but along a series of segments of a straight line. This deviation of the pin arrangement from the ideal helix is referred to as a defective helix.

In FIG. 5 the actual pattern of the pins on the shaft rolled into a plane is shown. The numbers of the pin traces are the same as those in the other figures. As can be seen from this FIG. 5, the axially adjacent pins are consecutively numbered. Thus pin 16, for instance, is axially adjacent to pin 15 and to pin 17, whereas neither pin 15 nor pin 17 is the closest pin to pin 16. The trace diagram shown in FIG. 5 is that of the imaginary cylinder that is located at the same distance from the hollow shaft 4 and from the housing 1.

During the operation of the pelleter, flocculent carbon black is introduced via inlet 6 into the annular space between shaft 4 and housing 1. The rotation of flight 9 advances this black towards the pelleting section of the shaft 4, which is provided with the pins 5. A pelleting liquid is injected into the same annular space between the shaft 4 and the housing 1 via the four openings 55 in the hollow cylinder 41 that are arranged 90° azimuthally apart and at the same axial location. The pelleting liquid can be plain water or it can be water containing such additives as $HNO_3$, molasses, lignosulfonate, or oil-water emulsion, etc. The rotation of the shaft 4 causes the mixture of carbon black and pelleting liquid to be moved to the left in FIG. 1 from the upstream location to the downstream location, and during this movement wet carbon black pellets are formed. These wet carbon black pellets are withdrawn via the outlet 7. The wet carbon black pellets are further processed by such as drying and are thereafter ready for packaging and shipment.

In the following a specific example for the dimensions of a carbon black pelleter in accordance with this invention is given:

| | |
|---|---|
| Length of the hollow cylinder 41 | 6 ft. 10 in. |
| External diameter d of the shaft 4 | 2 ft. 0 in. |
| Wall thickness of the hollow cylinder 41 | ⅜ in. |
| Axial length of the zone of the screw of flight 9 | 2 ft. 3 in. |
| Pitch of the screw of flight | 6 in. |
| Internal diameter D of the housing 1 | 3 ft. ⅛ in. |
| Diameter of the pins 5 | ⅜ in. |
| Distance between the pin end and the housing | ¼-⅜ in. |
| Pin length | 5 ⅞ in. |
| Axial distances between axially adjacent pins | ⅜ in. |

The shaft 4 with the pins 5 is rotated in this pelletizer for normal operations at about 200–450 rpm. The throughput of a pelletizer of this size will be about 4000 lbs./hr. of carbon black or about 8000 lbs./hr. of wet carbon black pellets.

The invention will be still more fully understood from the following example. This example is given to show the influence of the pins being arranged along a defective helix rather than on an undisturbed or perfect helix on the pellet size and size distribution.

EXAMPLE

In a lab size pelleter having a shape as shown in FIGS. 1, 2 and 3, flocculent carbon black and water containing 1% molasses was pelletized in a weight ratio of about 1:1. The shaft was rotated at about 400 rpm. The resulting pellets were dried and analyzed for the pellet size distribution in accordance with ASTM method 1511.

As a comparative run, the same quantity of carbon black and water was used to produce pellets in a pelleter that distinquished from the pelleter shown in FIGS. 1, 2 and 3 in the fact that the pins 5 were not arranged along a defective helix (see particularly FIG. 4) but were arranged along a nondefective helix so that both the axial distance between the pins and the azimuthal annular distance between adjacent pins were the same for the entire helix. The axial distance between adjacent pins was the same as for the defective helix, namely ⅜ inch, and the azimuthal distance between adjacent pins was 90°. The pellets produced in this pelleter were also dried and analyzed for their pellet size distribution in accordance with ASTM method 1511. The results of these test methods are shown in the following table.

TABLE

| Pellet Size Distribution (ASTM D 1511) | Pin geometry | |
|---|---|---|
| | Standard helix Wt. % | Defective helix Wt. % |
| On sieve 10 | 17.4 | 7.6 |
| On sieve 18 | 58.6 | 16.4 |
| On sieve 35 | 12.0 | 64.6 |
| On sieve 60 | 4.0 | 4.2 |
| On sieve 120 | 3.4 | 3.8 |
| In pan | 4.6 | 3.4 |
| Total wt. %, | 100.0 | 100.0 |
| In −18+60 range | 16 | 68.8 |

The above-shown results indicate that pelleting carbon black with a pelleter having the pins arranged on a defective helix as defined resulted in 68.8 wt. % of dry carbon black pellets in the desired −18+60 sieve range. Opposite thereto the pellets made in a pelleter having the pins arranged on a standard helix resulted in only 16 wt. % of dry pellets within the desired sieve range mentioned above. 76 wt. % of the carbon black produced in this pelleter with a standard helix distribution of the pins was larger than the desired sieve size range mentioned. The results also show that the pellets made by the pelleter having the defective helix distribution of the pins are smaller than pellets made in a pelleter differing from the pelleter of this invention only in having a pin geometry being a standard helix. A pellet size range of −18+60 sieve refers to pellets that pass through an 18-mesh sieve but are retained on a 60-mesh sieve. Larger sieve numbers, as usual, refer to finer openings in the sieve than smaller sieve numbers.

Reasonable variations and modifications which will become apparent to those skilled in the art can be made in this invention without departing from the spirit and scope thereof.

I claim:
1. A carbon black pelleter comprising
   a. a housing with a cylindrical internal surface,
   b. a shaft coaxially and rotatably arranged within said housing; and
   c. a plurality of pins evenly distributed on said shaft with the pin density being approximately the same for the entire length of the shaft, said pins extending essentially radially outwardly from said shaft into close proximity with the internal surface of the housing, and wherein said pins are arranged on the shaft so that the pitch of axially adjacent pins, defined by the formula

$$p = (360°/a \cdot t$$

wherein $p$ is the pitch of axially adjacent pins, $a$ is the azimuthal angular distance in degrees between axially adjacent pins along the shaft and $t$ is the axial distance between these axially adjacent pins, changes at least one time.

2. A pelleter in accordance with claim 1 wherein the pitch of axially adjacent pins changes a plurality of times along the shaft.

3. A pelleter in accordance with claim 1 wherein all the pins have the same axial distance $t$ to the axially adjacent pins and wherein the azimuthal angular distance between the axially adjacent pins changes a plurality of times.

4. A pelleter in accordance with claim 3 wherein the azimuthal angular distance between adjacent pins changes periodically.

5. A pelleter in accordance with claim 4 wherein the azimuthal angular distance between axially adjacent pins has a first value for a first number of consecutive pins, a second value for a second number of consecutive pins, and wherein this sequence is periodically repeated.

6. A pelleter in accordance with claim 5 wherein three consecutive pins have an azimuthal distance of 90° from the axially preceding pin, whereas the next pin has an azimuthal distance of 112°30′ from the next pin, and wherein this sequence of the azimuthal distance being three times 90° and one time 112°30′ is periodically repeated, and wherein the axial distance between one pin and the axially adjacent pin remains the same for all the pins.

7. A pelleter in accordance with claim 6 wherein the axial distance between the centers of adjacent pins is smaller than the diameter of these pins.

8. A pelleter in accordance with claim 7 wherein the axial distance between the centers of the adjacent pins is about 0.5 to about 0.9 time the pin diameter.

* * * * *

UNITED STATES PATENT AND TRADEMARK OFFICE
CERTIFICATE OF CORRECTION

PATENT NO. : 4,065,240
DATED : December 27, 1977
INVENTOR(S) : Clinie E. Cole

It is certified that error appears in the above—identified patent and that said Letters Patent are hereby corrected as shown below:

In the Abstract, the formula should read

--- $p = (360°/a) \cdot t$ ---.

Column 8, line 24, the formula should read

--- $p = (360°/a) \cdot t$ ---.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*